Patented Apr. 3, 1951

2,547,618

UNITED STATES PATENT OFFICE 2,547,618

MANUFACTURE OF FUNCTIONAL DERIVATIVES OF POLYVINYLIC COPOLYMERS

Jean Bisch and Xavier Thiesse, Salindres, France, assignors to Compagnie de Produits Chimiques et Electrometallurgiques Alais Froges et Camargue, Paris, France, a corporation of France No Drawing. Application November 1, 1948, Serial No. 57,828. In France November 3, 1947

2 Claims. (Cl. 260—73)

1

The present invention relates to the preparation of polyvinyl acetals from polyvinyl halide-polyvinyl ester copolymers.

It has already been suggested for the above purpose to operate in an organic medium, and polyvinyl chloride-polyvinylacetate copolymers or more generally polyvinyl halide-polyvinyl ester copolymers have been mentioned as suitable starting materials usable for the purpose. However, actual examples have never been given in support of the practicability of using such resins for the purpose described.

We have now discovered that the above-defined copolymers may be converted into plastics endowed with greatly improved physical and chemical properties over the starting materials, and also over ordinary acetals, by saponifying said copolymers in an aqueous medium in the presence of a strong mineral acid and then acetalizing the resulting product in the same medium by means of one or more aldehydes or ketones, the concentrations of the constituents being if necessary suitably modified by diluting the product, with water for instance.

In effecting the above-mentioned conversions, consideration should be given to the following observations. The vinyl chloride-acetate copolymers, and more broadly the polyvinyl-halide-organic polyvinyl ester copolymers are capable of absorbing at ordinary temperature relatively concentrated aqueous solutions of strong mineral acids, for instance hydrochloric acid at 25 to 36% concentration. Such absorption is accompanied by a swelling and a partial saponifying of the organic polyvinyl ester groups of the resin. In general, even if a sufficiently small amount of the mineral acid solution be used, the free organic acid released in this step is produced in amounts large enough for the reactant medium to become completely homogeneous, because of the dissolution of the hydrolysis product in the liquid phase present.

The hydrolysis initiated under such conditions may be continued in a homogeneous or a heterogeneous phase, depending on the halide content in the initial copolymer, merely by adding water, the rate of dilution being for instance so adjusted as to cause the concentration in the catalyst to be constantly sufficient in value to suitably further the reaction. Where the initial resin contains over 10% by weight of polyvinyl halide, the hydrolysis product forms, at the time the dilution is effected, an extremely stable emulsion having a particle size on the order of 0.1 micron.

The emulsions thus obtained are particularly suitable for use in the herein-contemplated chemical conversion processes, to wit: completion of the hydrolysis or conversion into condensation products with one or more aldehydes or ketones for instance, especially so since it is possible without modifying the form or the size of the particles, to bring the content of the active constituents, including the polymers, catalysts and aldehydes, in the emulsion, to any desired value as best suited for the condensation reaction contemplated, merely by diluting it with water.

In order to protect to the greatest possible extent the structure of the macro-molecule during the said conversion operations, it is preferred to operate at about room temperature and use the smallest practicable amounts of the acidic catalyst, such amounts being under about 50% for example, based on the copolymer, expressed in terms of anhydrous hydrochloric acid.

The ensuing examples will serve further to illustrate the above stated principles of the invention, it being undertood that they are in no way restrictive as to the concentrations and character of the reagents used and the reaction temperatures and times given.

Example 1

180 parts by weight of a polyvinyl chloride-acetate copolymer in the form of beads containing 6.5% by weight of polyvinyl chloride, are suspended at ordinary temperature, by means of a mixer device, in 360 parts by weight of 25% aqueous hydrochloric acid. At the end of a few hours mixing at room temperature, the suspension is found to be converted to the state of a homogeneous viscous solution.

This mixture is then diluted, with agitation, in 750 parts water. The end of the dilution period is accompanied by a precipitation of the hydrolysis product in the form of an emulsion, extremely stable in character having a particles-size on the order of 0.1 micron.

Acetalization is effected by adding to the said emulsion, cooled down to 0° and stirred, 37 parts by weight acetaldehyde and 30 parts by weight butyraldehyde, with the butyraldehyde being added an hour later than the acetaldehyde.

Upon heat being applied to restore the temperature to about normal, the reaction proceeds to completion within a few hours and after centrifuging, washing and drying, there are obtained 120 parts by weight of a pulverulent porous acetobutyral containing 4.2% polyvinyl acetate groups, 9.6% polyvinyl chloride groups, 86.2% polyvinyl aceto-butyral, practically free of any unconverted polyvinyl alcohol.

*Example 2*

A polyvinyl chloride-acetate copolymer containing 8.3% of the chloride constituent is treated under similar conditions as those described above in Example 1.

When 180 parts by weight of the copolymer are used, 122 parts of similarly pulverulent porous acetobutyral are obtained, containing 5.8% polyvinyl acetate groups, 13.4% polyvinyl chloride groups, 13% polyvinyl alcohol groups and 67.8% polyvinyl acetobutyral groups.

In another example, hydrolysis is effected under similar conditions as described in Example 1; however the emulsion in this case forms after much smaller amounts of water are added than in the first example.

The total amount of water added is 835 parts by weight.

Acetalization is effected with the same amounts of aldehyde and in the same operating conditions as described in connection with Example 1. The resulting pulverulent porous resin contains 3.8% polyvinyl acetate groups, 24% polyvinyl chloride groups, 5.4% polyvinyl alcohol groups and 66.8% polyvinyl acetobutyral groups.

All the above-prepared resins possess good solubility in the majority of usual solvents, except alcohols with which they tend to form gels.

In the above examples, the acetaldehyde may be replaced by formaldehyde, propionaldehyde, butyraldehyde or aldehydes having more than four carbon atoms per molecule, and the aldehydes may be replaced by ketones.

What we claim is:

1. A process for the production of a polyvinyl acetal from a copolymer of polyvinyl chloride and a polyvinyl ester of a lower aliphatic acid at substantially ordinary temperature in an aqueous medium and in absence of added solvent, said process comprising (a) a two-stage hydrolysis of the said copolymer by subjecting the same, in a first stage, to the action of an aqueous hydrochloric acid solution of 25 to 36% concentration in such amount that the weight of hydrochloric acid, expressed as anhydrous HCl, is increased to more than 50% of the weight of copolymer, until a homogeneous reaction mass is obtained, and then, in a second stage, diluting the said reaction mass with water until the total weight of water is equal to about 5 times the weight of the copolymer, and (b) the acetalization of the resultant hydrolysis product in the same medium by the action thereon for a period of more than one hour of at least one unsubstituted aliphatic aldehyde.

2. A process for the production of a polyvinyl acetal from a polyvinyl chloride-polyvinyl acetate copolymer at substantially ordinary temperature in an aqueous medium and in absence of added solvent, said process comprising (a) a two-stage hydrolysis of the said copolymer by subjecting the same, in a first stage, to the action of an aqueous hydrochloric acid solution of 25 to 36% concentration in such amount that the weight of hydrochloric acid, expressed as anhydrous HCl, is increased to more than 50% of the weight of copolymer, until a homogeneous reaction mass is obtained, and then, in a second stage, diluting the said reaction mass with water until the total weight of water is equal to about 5 times the weight of the copolymer, and (b) the acetalization of the resultant hydrolysis product in the same medium by the action thereon for a period of more than one hour of acetaldehyde and butyraldehyde.

JEAN BISCH.
XAVIER THIESSE.

REFERENCES CITED

The following references are of record in the file of this patent:

UNITED STATES PATENTS

| Number | Name | Date |
|---|---|---|
| 1,939,422 | Voss | Dec. 12, 1933 |
| 2,035,939 | Belloc | Mar. 31, 1936 |
| 2,333,804 | Malm | Nov. 9, 1943 |
| 2,457,261 | Morrison | Dec. 28, 1948 |

FOREIGN PATENTS

| Number | Country | Date |
|---|---|---|
| 477,885 | Great Britain | Jan. 7, 1938 |
| 813,303 | France | Feb. 22, 1937 |
| 849,460 | France | Aug. 21, 1939 |